July 9, 1957  J. G. SPARKES  2,798,988
ELECTROLYTIC CAPACITOR
Filed Jan. 28, 1954
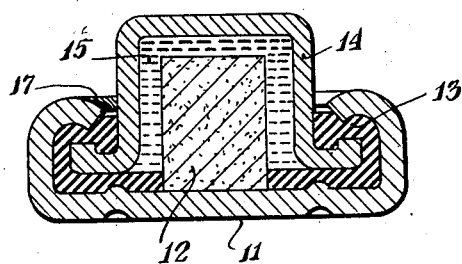
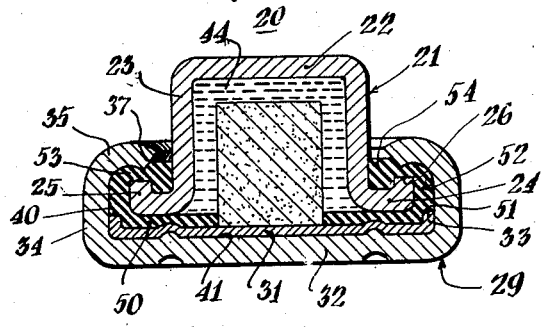
INVENTOR
Julian G. Sparkes
ATTORNEY

United States Patent Office 2,798,988
Patented July 9, 1957

2,798,988
ELECTROLYTIC CAPACITOR

Julian G. Sparkes, Indianapolis, Ind., assignor to P. R. Mallory & Co., Inc., Indianapolis, Ind., a corporation of Delaware Application January 28, 1954, Serial No. 406,817

7 Claims. (Cl. 317—230)

This invention relates generally to electrolytic apparatus and has specific application to such apparatus including means and methods for providing electrolytic cells operable over wide temperature ranges.

The operation of electrolytic cells or capacitors substantially depends upon a film which may be formed on the surface of a metal, such as aluminum or tantalum, when immersed in a suitable electrolyte and subjected to electrical current; which film possesses the property of allowing current to flow from an electrolyte to the electrode with little opposition, but of strongly opposing current flow from the electrode to the electrolyte.

One such capacitor is a tantalum capacitor which is shown and described in U. S. Patent 2,617,863, issued to George H. Stinson and assigned to P. R. Mallory & Co., Inc. This capacitor is designed for operation over a wide range of temperatures, for example —60° C. to 200° C. The basic cell structure utilizes a tantalum anode assembly wherein the structural strength and sealability of the unit depends upon the thickness of the sheet tantalum which comprises the cup or top of the unit cell. A material thickness on the order of 20 mils has been established as that thickness which will provide a satisfactory seal and withstand physically the external pressures necessary to maintain the seal on the structure throughout the manufacturing process and subsequent life in the field. Any appreciable decrease in the thickness of the tantalum material, per se, would result in the structure being weakened to such an extent that the applied external and/or the generated internal pressures would collapse the cell and render it ineffective.

However, due to the extremely high cost per pound of the tantalum sheet and to the limited supply of the material available, such a reduction in tantalum material thickness would be highly desirable.

In present tantalum capacitors it is found that if the capacitor need be reworked for any fault, such as defective sealing or for any other internal reason after sealing has been made, or the capacitor seal has been crimped to the cathode cup so as to make a unit cell, then, there may be little opportunity to salvage any of the tantalum such as the tantalum top to which is welded a porous sintered tantalum seal. This, of course, adds to the expense of fabrication of the capacitor.

The present invention has provided means and methods for overcoming this factor and as such is an important advance in the construction of such cells, inasmuch as the initial cost thereof may be substantially reduced and since means are also provided for salvaging tantalum materials if desired.

It is, therefore, an important object of the present invention to provide means and methods for manufacturing a basic tantalum capacitor cell which operates over wide temperature ranges and wherein the quantity of expensive tantalum materials used in producing the cells may be reduced without any attendant loss in strength or sealing characteristics thereof.

Still another object of the present invention is to manufacture a tantalum capacitor cell which operates over wide temperature ranges, said cell being comparatively inexpensive yet exceedingly efficient.

Another object of the present invention is to provide a compact tantalum capacitor wherein quantities of tantalum material heretofore used in the construction of such cells may be saved.

Still another object of the present invention is to provide means by which components of the tantalum cell may be quickly and efficiently assembled and wherein, if necessary, such components of said assembly may be disassembled without substantial damage to the expensive tantalum materials used therein.

Yet another object of the present invention is to provide means for extending the life of the manufacturing tools used in the assembly of said tantalum condensers by making it possible to prolong the life of the dies used in the cell closure operations and in sealing said tantalum capacitors.

Still another object of the present invention is to provide a new and improved tantalum capacitor operative over wide ranges of temperature, for example from —60° to 200° C.

Still another object of the present invention is to provide an electrolytic capacitor having a suitable container capable of holding an electrolyte under extreme ranges of temperature and pressure and wherein portions of tantalum material heretofore used in the construction of such cells may be eliminated without loss in the efficiency or durability of such cells.

The invention in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in connection with the accompanying figures of the drawing and wherein like reference characters describe elements of similar function therein and wherein the scope of the invention is determined rather from the dependent claims.

For illustrative purposes the invention will be described in connection with the accompanying drawing, in which:

Figure 1 is a vertical sectionalized view of an embodiment of a tantalum capacitor as particularly adapted to illustrate the former construction of a tantalum capacitor; and Figure 2 is a vertical sectionalized view of an embodiment of the present novel improved tantalum capacitor capable of operating over wide ranges of temperature and wherein novel constructional means have been afforded for obviating the necessity of using expensive tantalum materials therein and wherein such a capacitor is provided having economical, durable and efficient characteristics.

By the present novel invention there is provided an improved compact, self-contained electrolyte cell or capacitor using an improved construction so as to obviate the necessity for utilization of expensive tantalum metal. In the invention an appreciable amount of tantalum is eliminated by providing for a decrease in the thickness of the tantalum material, for example, about 50% thereof, without weakening the capacitor structure generally. In the present advanced and improved construction a novel silver plated steel backing is provided to replace a portion of the tantalum as heretofore used in the cell. Thus a great deal of expensive tantalum material may be eliminated with a consequent reduction in the cost of assembly of such a cell.

Generally speaking, the present invention provides an electrolytic capacitor capable of operating over a widely varying range of temperature, for example, −60° C. to 200° C. instead of the heretofore usual range of temperatures of −40° C. to plus 95° C. The capacitor comprises a compact self-contained electrolytic cell adapted to operate continuously at a given voltage throughout the above wide range of temperatures and provides means for withstanding alternate periods of exposure to the lowest and highest temperatures, respectively, without losing its seal. The cathode of the capacitor is constructed of silver and because of the compact arrangement of the cell it may be constructed as part of the container thereof.

The anode thereof is fabricated of tantalum material comprising a tantalum pellet and a tantalum sheet connected thereto. In the construction of the cell the cost of tantalum is an important factor. It is apparent that any saving in the use of tantalum materials will result in a lowering of the manufacturing costs. But this, although desirable, can not be done if the efficiency of the cell will be adversely affected, either in operation or durability. After considerable experiment and research means for accomplishing the result have been found. This has been done by providing steel backing means for supplanting a portion of the thickness of the tantalum used, with said backing means being important in providing a tight capacitor seal. Thus, a portion of the tantalum sheet used to crimp and seal the capacitor may be removed to a point where recovery of tantalum materials becomes feasible, should this be necessary.

Referring to the drawings, Figure 1 represents the construction used before the advent of the present invention. As seen, 10 represents a tantalum cell or capacitor. The cell comprises an anode structure consisting of a tantalum top or sheet 11 connected to a tantalum pellet 12 made from pressed and sintered tantalum metallic powder. The sintered pellet may be spot welded or otherwise formed by suitable connecting means to the tantalum top. The casing or cover of the cell 14 acts as the cathode electrode of the cell and is fabricated of a metal, such as silver, which is found to have special suitability for the sulphuric acid electrolyte 15 used. The tantalum anode assembly is insulated from the cathode wall structure of the cell by means of a gasket 13 fabricated of a material suitable from the standpoint of corrosion resistance and high temperature characteristics, for example polytetra-fluoroethylene polymer. The cell has a crimp type closure. The tantalum sheet 11 has a top edge 17 crimped over to form a support for the gasket 13 and cover 14. Thus a tight seal is formed for the entire construction.

In Figure 2, the improved capacitor construction is shown. Tantalum cell 20 comprises a cathode cup structure 21 having a top surface 22 and an annular side wall 23 terminating on a bottom flange comprising an extension section 24 bent in a horizontal plane to said side wall 23 and a vertically extending tip section 25 bent upright therefrom and having an end surface 26. The cup structure may be fabricated of the metal, silver.

Substantially centrally disposed within the cup and extending upright concentrically therewithin is a tantalum pellet 30 made from pressed and sintered tantalum metallic powder. The pellet is joined to a relatively thin sheet of tantalum 31 as by welding. The sheet of tantalum 31 has a small vertically extending lip or end wall 33, in Figure 2, and corresponds to the analogous tantalum sheet 11 shown in Figure 1. It is immediately apparent that the thickness and length of the tantalum sheet has been extremely curtailed, as a matter of fact by approximately 66.3%.

A steel backing member 29 having the shape of a cup comprising a bottom wall 32, a vertically extending side wall 34 and a top portion 35 having an end 37 is joined to tantalum sheet 31 in a manner such that wall 32 intimately engages and is bonded to tantalum sheet 31, and whereby small end wall 33 merely extends for a small distance along side wall 34 of the backing to a point 40 therealong substantially displaced from tip 37 of top portion 35 of the backing. If desired, the steel backing member may be silver plated. The electrolyte 44 used on the capacitor may be sulphuric acid.

The anode assembly, comprising the steel backing, tantalum pellet and tantalum sheet placed inside the backing along the inside wall 41 thereof, is insulated from the cathode assembly by means of gasket fabricated of a material suitable from the standpoint of corrosion resistance and high temperature characteristics, for example, polytetra-fluoroethylene polymer. The gasket comprises bottom wall 50, a step portion 51, a side portion 52, an intermediate portion 53 and a dependent portion 54.

The cell has a crimp type closure. However, where in contrast to the structure shown in Figure 1 a portion of the tantalum sheet was used in forming the seal by being crimped over the gasket, now, only the steel backing is so used. In Figure 2, it is seen that the tantalum sheet ends far short of top portion 35 and tip 37 of the backing cup, with a great saving in the amount of tantalum used. It is also apparent that because of the manner in which the individual components of the cell are now assembled, the structure can be expeditiously disassembled even after crimping so that neither the tantalum sheet nor sintered pellet is damaged thereby. Again, by the use of a silver plated steel backing member the life of the manufacturing tools will be increased. This is so because heretofore the die used had to crimp electroformed tantalum which is very hard, whereas in the present construction the silver of the plated steel will act as an excellent lubricant and greatly decrease die wear.

Thus, there has been constructed an improved and novel tantalum capacitor which may provide substantial savings in manufacturing costs, yet, will give optimum efficiency and electrical characteristics. However, the description thereof as above provided is merely illustrative and not exhaustive in scope and since many widely different embodiments of the invention may be made without departing from the scope thereof, it is intended that all matter contained in the above description and shown in the accompanying drawing shall be interpreted as illustrative and not in a limiting sense.

What is claimed is:

1. An electrolytic capacitor adapted to operate over a wide range of temperatures comprising a container acting as a silver cathode therefor, an anode placed in said container, said anode being constructed of a sheet of tantalum, a steel backing of longer length than said sheet of tantalum connected to the underside of said sheet of tantalum, a pellet fabricated of pressed and sintered metallic tantalum powder, an electrolyte contiguous with said cathode and said anode, and gasket means for insulating said cathode electrically from said anode.

2. An electrolytic capacitor adapted to operate over a wide range of temperatures comprising a casing of silver acting as a cathode therefor, an anode assembly contained within said casing, said assembly comprising a sheet of tantalum, a steel backing of longer length than said sheet of tantalum connected to the underside thereof, a tantalum pellet fabricated of pressed and sintered metallic tantalum powder substantially centrally connected to said tantalum sheet, an electrolyte making contact between said cathode and said anode assembly, a gasket interposed between said cathode and said anode assembly to electrically insulate the same from each other, and means for maintaining said gasket between said cathode and said anode assembly under seal during operation over wide ranges of temperature and pressure.

3. An electrolytic capacitor for operation over wide ranges of temperatures and pressures comprising a silver casing adapted to act as a cathode thereof, an anode assembly including a thin sheet of tantalum, a steel backing underlying said tantalum sheet and being intimately bonded thereto, said backing being substantially longer and considerably thicker than said tantalum sheet, a pellet of tantalum being substantially centrally connected to the top surface of said tantalum sheet, an electrolyte acting upon said cathode and said anode making contact therewith, and a gasket fabricated of a material inert to said electrolyte placed between said cathode and said anode assembly so as to electrically insulate the same, said steel backing only being crimped against said gasket so as to seal said capacitor and to maintain the seal between said cathode and anode under pressure during operation over wide ranges of temperatures and pressures.

4. An electrolytic capacitor adapted to operate over a wide range of temperatures comprising a casing therefor, said casing adapted to act as a cathode of said capacitor, an anode assembly comprising a tantalum sheet, a silver coated steel backing bonded to said tantalum sheet, said backing being substantially longer and thicker than said tantalum sheet, a tantalum pellet connected to said tantalum sheet, an electrolyte contiguous between said cathode and said anode assembly, and a gasket inert to said electrolyte of said capacitor, said backing being crimped against said gasket so as to maintain the same under seal for electrically insulating said cathode and said anode assembly during operation over a wide range of temperature and pressure operations.

5. An electrolytic capacitor adapted to operate over a wide range of temperatures comprising a silver container acting as a cathode therefor, an anode assembly including a tantalum sheet, a backing of steel bonded thereto, a pellet of sintered and pressed tantalum powder connected to said tantalum sheet on the opposite side thereof, an electrolyte of sulphuric acid contiguous with said cathode and said anode assembly, and a gasket inert to said electrolyte placed along the bottom of said cathode separating said cathode from said anode so as to completely electrically insulate the same, said steel backing only being crimped against said gasket to tightly seal the capacitor for operation at high temperatures and pressures.

6. An electrolytic capacitor adapted to operate over a wide range of temperatures and pressures comprising, a cathode fabricated of silver acting as a container therefor, an anode assembly including a thin tantalum sheet, a backing of steel bonded to the underside of said tantalum sheet, said backing being substantially thicker and longer than said tantalum sheet, and a pellet of tantalum substantially centrally connected to the top side of said tantalum sheet placed within said cathode, an electrolyte contiguous with said cathode and said anode assembly, and insulating means inert to said electrolyte placed along the bottom of said cathode electrically separating said cathode from said anode assembly, said steel backing only being crimped against said insulating means to tightly seal the capacitor thereby for operation at high temperatures and pressures, said tantalum sheet thus being substantially removed from said crimped seal so as to be free of mutilation and whereby said tantalum sheet and pellet may be removed and salvaged, if desired.

7. An electrolytic capacitor adapted to operate over wide ranges of temperatures and pressures comprising a silver container acting as a cathode therefor, a tantalum sheet, a backing of steel substantially larger than said tantalum sheet bonded thereto, the entire length of said sheet covering considerably less area than said entire steel backing, a pellet of tantalum connected substantially at the center of said tantalum sheet opposite said surface connected to said backing, said tantalum sheet and pellet comprising the anode assembly for said capacitor, an electrolyte contiguous with said cathode and said tantalum sheet and pellet, and a gasket interposed between said cathode and said anode assembly fabricated of material inert to said electrolyte, said gasket being crimped by a portion only of said steel backing substantially removed from said tantalum sheet so as to maintain a tight seal for said capacitor during operation thereof, said tantalum sheet being free of said crimping so as to be easily removable, if desired.

References Cited in the file of this patent

UNITED STATES PATENTS 1,933,319    Driggs  ---------------- Oct. 31, 1933
2,617,863    Stinson  ---------------- Nov. 11, 1952

OTHER REFERENCES

Miniaturizing the Tantalum Capacitor, an article reprinted from Electrical Manufacturing, December 1950, pages 82–85.